US008035394B2

(12) United States Patent
Takeno et al.

(10) Patent No.: US 8,035,394 B2
(45) Date of Patent: Oct. 11, 2011

(54) BATTERY TESTING DEVICE AND BATTERY TESTING METHOD (75) Inventors: Kazuhiko Takeno, Yokohama (JP); Takayuki Kanai, Yokohama (JP); Haruo Uemura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 270 days.

(21) Appl. No.: 12/314,236

(22) Filed: Dec. 5, 2008

(65) Prior Publication Data

US 2009/0146663 A1  Jun. 11, 2009

(30) Foreign Application Priority Data

Dec. 7, 2007  (JP) ................ P2007-317534

(51) Int. Cl.
*G01N 27/416* (2006.01)
(52) U.S. Cl. ...................................... 324/426
(58) Field of Classification Search .............. 324/426; 429/61, 62; 361/86, 93.8
See application file for complete search history.

(56) References Cited

U.S. PATENT DOCUMENTS

| 5,902,697 | A | 5/1999 | Guindy et al. | |
|---|---|---|---|---|
| 6,472,097 | B1 * | 10/2002 | Ohbayashi et al. | 429/82 |
| 6,602,633 | B1 * | 8/2003 | Ohbayashi et al. | 429/82 |
| 2005/0253591 | A1 * | 11/2005 | Kasamatsu et al. | 324/432 |

FOREIGN PATENT DOCUMENTS

| JP | 2005-327616 | 11/2005 |
|---|---|---|
| KR | 1020010043584 A | 5/2001 |

OTHER PUBLICATIONS

Jiang Fan, "GP L210: A New Milestone for the 18650 Cell", IEEE Aerospace and Electronic Systems Magazine, IEEE Service Center, vol. 17, No. 11, XP011092491, Nov. 1, 2002, pp. 7-10.
"UL Standard for Safety for Lithium Batteries, UL 1642", Underwrites Laboratories, [online], URL:http://imgl.zyzhan.com/5/20090519/633783482645312500.pdf>, XP-002547361, Jun. 24, 1999, pp. 15-16.
R. Spotnitz, et al. "Abuse behavior of high-power, lithium-ion cells", Journal of Power Sources, vol. 113, No. 1, XP004399048, Jan. 1, 2003, pp. 81-100.
Office Action issued Oct. 19, 2010 in Korean Application No. 10-2008-0122988 (With English Translation).
Office Action issued Nov. 17, 2010, in China Patent Application No. 200810177123.7 (with English-language Translation).
Office Action dated Jun. 29, 2011, in Korean Patent Application No. 10-2008-0122988, (w/English translation), pp. 1-5.

\* cited by examiner

*Primary Examiner* — Richard V Muralidar
(74) *Attorney, Agent, or Firm* — Oblon, Spivak, McClelland, Maier & Neustadt, L.L.P.

(57) ABSTRACT

The present invention provides a battery testing device and a battery testing method which can appropriately verify the behavior of a battery when damage occurs. Appropriately verification of battery behavior in a case of battery damage has not been achieved since a completely crushed state of a battery almost never occurs during the sue of a portable device, such as a portable telephone, and a completely crushed state of a battery is not the worst condition when determining an abnormality induced by an internal short. Therefore a secondary battery set on a test stand is partially crushed using a pressing member, and the quality of the secondary battery is determined by measuring the temperature of the secondary battery, whereby battery behavior when the secondary battery is damaged can be appropriately verified.

18 Claims, 11 Drawing Sheets

BATTERY TESTING DEVICE AND BATTERY TESTING METHOD

BACKGROUND OF THE INVENTION

1. Field of the Invention

The present invention relates to a testing device and a testing method for improving performance and safety of a battery such as a lithium ion battery enclosed in a portable telephone and other portable equipment.

2. Related Background Art

A rechargeable secondary battery enclosed in portable telephones and other portable equipment, a lithium ion battery, for example, has a lithium cobalt oxide compound for an anode, graphite for a cathode and organic electrolytes containing lithium salt. This secondary battery is comprised of a separator, which is a thin film that electrically insulates an anode and a cathode, and the anode, cathode and separator are rolled. In the case of a square shaped lithium ion battery, the rolled battery is transformed into a square shape, and is inserted into a square aluminum case, where electrolytes are filled, and is sealed.

The lithium ion battery is compact, light weight and has high energy density, and therefore the battery is constructed by thin anode and cathode films, using a chemically highly active cobalt oxide compound and organic electrolytes. In order to further decrease the size and weight of the battery, the above battery materials are contained in a light aluminum case.

In a lithium ion battery having this type of structure, an internal short of the anode and cathode may be caused by damage to the electrodes inside due to external pressure, resulting in abnormal heating and smoking of the battery. To prevent this, safety tests to insure safety in a damaged state have been performed by intentionally destroying the lithium ion battery (see Japanese Patent Application Laid-Open No. 2005-327616). For example, in this kind of safety test, a fully charged lithium ion battery is completely crushed (complete crush) by pressing a metal bar (round bar) from the outside, and the behavior of the battery after the complete crush, such as abnormal heating (about 160° C. or higher) or smoking, is checked. And only batteries which do not generate an abnormal state, including abnormal heating and smoking, are determined as non-defective batteries (OK batteries), thereby safety of the batteries is evaluated.

However it is rare that a force to cause a complete crush of a battery is applied from the outside to a general lithium ion battery enclosed in a portable telephone or the like, where a force to partially damage a battery (partial crush) is more likely to be applied. Hence the complete crush test of batteries is an extreme test, and is not appropriate as a test to determine the behavior of a battery when the battery is damaged in a normal use range of a portable telephone.

SUMMARY OF THE INVENTION

With the foregoing in view, it is an object of the present invention to provide a battery testing device and a battery testing method which can appropriately verity the behavior of a battery when damage occurs.

After long consideration to appropriately evaluate the safety of batteries, the inventor of the present application discovered that in a lithium ion battery, internal heating caused by an internal short could quickly drops in the case of a complete crush, since the entire battery system is destroyed. On the other hand, the internal heating caused by an internal short continues in the case of a partially damaged lithium ion battery, since the battery system, other than the damaged portion, continuously operates. As a result, the inventor discovered that in the case of a lithium ion battery damaged by applying force from the outside, a partial crush easily makes safety more unstable (generates abnormal heating and smoking). The present invention is based on this discovery.

A battery testing device according to the present invention has: a test stand for setting a battery; a pressing member for crushing the battery; pressurizing unit for controlling the pressing force of the pressing member to the battery; and measurement unit for measuring at least one of temperature and voltage of the battery, wherein the pressurizing unit controls the pressing force so that the battery is incompletely and partially crushed, and the measurement unit measures at least one of temperature and voltage of the partially crushed battery.

A completely crushed state of a battery is a state which almost never occurs when a portable equipment, such as a portable telephone, is being used, and is not the worst condition when the occurrence of an abnormality, due to an internal short, is determined, so behavior in a case when a battery is damaged cannot be appropriately verified. According to the present invention, however, temperature or voltage is measured in a state where the battery is partially crushed, so the behavior when the battery is damaged can be appropriately verified.

It is preferable that the pressing member partially crushes a plurality of identical batteries subjected to testing targets, the pressurizing unit controls the pressing force so that a depth of a partial crush in each of the plurality of batteries is different respectively, and the measurement unit measures at least one of temperature and voltage of each of the plurality of the partially crushed batteries respectively. Since the depth of the partial crush is different for each of the plurality of testing target batteries, the behavior of the battery when the battery is damaged at a respective depth of the partial crush can be appropriately verified.

It is preferable that the pressurizing unit controls the pressing force so as to satisfy the following Expression (1):

$$D=(Na/N_M) \times L \qquad (1)$$

where D is the depth of partial crush of each of the plurality of batteries, $N_M$ is a number of all the testing targets, Na is a natural number from 1 to $N_M$ corresponding to each of the plurality of batteries respectively, and L is a distance from a top end to a bottom end of the battery in a state where the battery is set on the test stand.

According to this battery testing device, quantitative verification based on Expression (1) becomes possible, and evaluation comparing with other kinds of batteries can be easily determined.

It is preferable that the plurality of batteries are partially crushed in a sequence according to the natural numbers Na, the pressurizing unit controls the pressing force so that the depth D increases stepwise, and the measurement unit measures at least one of temperature and voltage of each of the plurality of the partially crushed batteries, and determines a first natural number Na of which measurement result exceeds a predetermined threshold. The quality of a battery can be decided based on the determined Na.

It is preferable that the pressing member drops down to the battery set on the test stand from a predetermined height to partially crush the battery, and the pressurizing unit controls the pressing force by adjusting the predetermined height. According to the present invention, the behavior of the battery partially crushed by a drop and impact can be verified.

It is preferable that the battery is a square shaped type, a bar type interference member which rests against a corner portion of the battery set on the test stand is further provided, and the pressing member partially crushes the corner portion of the battery indirectly by colliding with the interference member. According to the present invention, the corner portion of the battery can primarily be partially crushed, and the behavior of the battery of which corner portion is partially crushed due to the drop and impact by the pressing member can be verified.

It is preferable that the pressing member partially crushes each of the plurality of identical batteries subjected to testing targets, the pressurizing unit controls the pressing force so that the predetermined heights from each of the plurality of batteries are different respectively, and the measurement unit measures at least one of temperature and voltage of each of the plurality of the partially crushed batteries respectively. By changing the predetermined height, the pressing force of the pressing member due to a drop and impact can be easily controlled.

It is preferable that the pressurizing unit controls the pressing force so as to satisfy the following Expression (2):

$$H = Ho \times Nb \qquad (2)$$

where H is the predetermined height from each of the plurality of batteries, Ho is a reference height, and Nb is a natural number which is sequentially assigned from 1 corresponding to each of the plurality of batteries respectively.

According to this battery testing device, quantitative verification based on Expression (2) becomes possible, and evaluation comparing with other kinds of batteries can be easily determined.

It is preferable that the plurality of batteries are partially crushed in the sequence according to the natural number Nb, the pressurizing unit controls the pressing force so that the height H increases stepwise, and the measurement unit measures at least one of temperature and voltage of each of the plurality of the partially crushed batteries, and determines a first natural number Nb of which measurement result exceeds a predetermined threshold. The quality of a battery can be decided based on the determined Nb.

It is preferable that the measurement unit measures the respective temperature of each of the plurality of partially crushed batteries, and the predetermined threshold is included in a 150° C. to 160° C. range. If an internal short is generated by partially crushing a battery, particularly a secondary battery, the temperature of the secondary battery is increased by Joule heat due to the short circuit current, and when the temperature of the secondary battery reaches a critical temperature (temperature at which the thermal decomposition of the material of the secondary battery 2 starts: about 150° C. to 160° C.), thermal decomposition of battery materials used for the electrode and electrolytes of the secondary battery 2 starts, whereby thermo-runaway starts. It is therefore most desirable to monitor whether the temperature of the secondary battery reaches the critical temperature as the reference to determine a defective battery, and the predetermined threshold is preferably set to a predetermined temperature included in a 150° to 160° C. range.

A battery testing method according to the present invention comprises: a partial crushing step of applying a pressing force to a battery so that the battery set on a test stand is incompletely and partially crushed; a determination step of detecting at least one of temperature and voltage of the partially crushed battery; and a determination step of determining whether the measurement result in the detection step is a predetermined threshold or more.

According to the present invention, temperature or voltage is measured in a state where the battery is partially crushed, so the behavior when the battery is damaged can be appropriately verified.

It is preferable that a battery is sequentially selected from a plurality of identical batteries subjected to testing targets; the partial crushing step, the detection step and the determination step are performed for the selected battery; the pressing force to be applied to the battery stepwise is increased according to the sequence in the partial crushing step; and determination is made that the battery is a non-defective product, when determined, in the determination step, that a value, which indicates the sequence of a first battery exhibiting a measurement result that exceeds a predetermined threshold, is equal to a quality determination reference value or more.

It is preferable that the battery is a square shaped type, having a pair of plane portions facing each other on peripheral surfaces and side face portions, of which area is smaller than the plane portions, and the quality determination reference value in the case of partially crushing each of a plurality of batteries by applying a pressing force on the plane portion is smaller than that in the case of partially crushing each of the plurality of batteries by applying a pressing force on the side face portion. According to the present invention, evaluation in the case when the thin side of the battery is damaged becomes more strict, and higher safety can be implemented.

According to the present invention, the behavior of a battery when the battery is damaged can be appropriately verified.

DESCRIPTION OF THE PREFERRED EMBODIMENTS

Preferred embodiments of the present invention will now be described with reference to the drawings.

Figure 1:
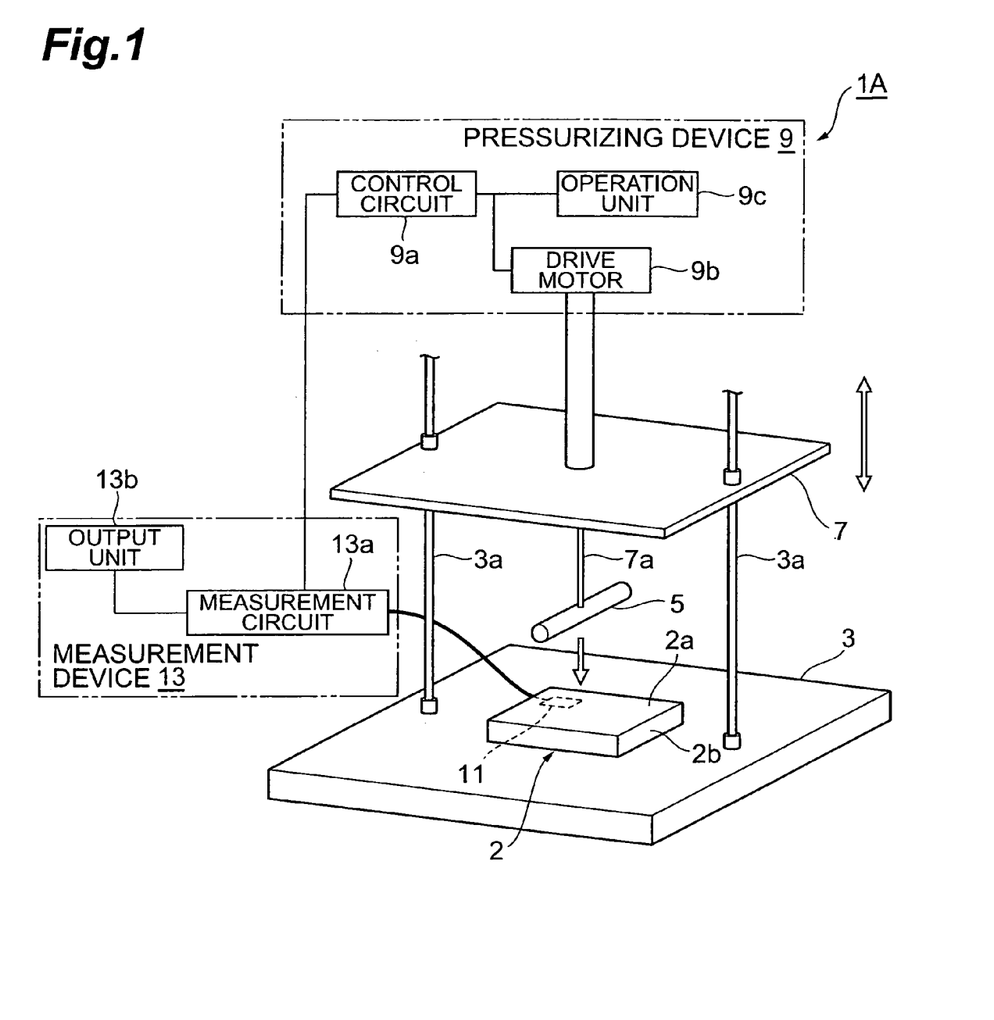
FIG. 1 is a diagram depicting an overview of the battery testing device according to a first embodiment of the present invention.

FIG. 1 is a diagram depicting an overview of a battery testing device according to the first embodiment. The battery testing device 1A is a device for measuring behavior of a rechargeable secondary battery 2, such as a lithium ion battery and a lithium polymer battery, when the battery is damaged. The testing target of the battery testing device 1A is not limited to the secondary battery, but may be a primary battery, for example.

The battery testing device 1A has a test stand 3 on which a testing target secondary battery 2 is set, a round bar (pressing member) 5 which contacts and crushes the secondary battery 2, a pressurizing device (pressurizing unit) 9 which is connected to a movable plate 7 for raising/lowering the round bar 5 from/to the secondary battery 2, and controls the pressing force of the round bar 5 to the secondary battery 2, a temperature sensor 11 which contacts the secondary battery 2 placed on the test stand 3, and a measurement device 13 which is connected to the temperature sensor 11. In the present embodiment, behavior of the crushed secondary battery 2 is verified based on the temperature detected by the temperature sensor 11, but detection unit, for measuring the voltage of the secondary battery 2 or measuring both temperature and voltage thereof, may be disposed instead of the temperature sensor, so as to verify the behavior of the crushed secondary battery 2 based on this measurement result.

A pair of guide bars 3a is vertically set on the test stand 3, sandwiching a predetermined location where the secondary battery 2 is set, and the movable plate 7 rises/lowers along a predetermined track by being guided by the guide bars 3a. A round bar securing rod 7a protrudes from the bottom face of the movable plate 7, and the round bar 5 is secured at the bottom end of the round bar securing rod 7a so that the round bar 5 becomes horizontal (vertical with respect to the round bar securing rod 7a).

The pressurizing device 9 has a control circuit 9a which is comprised of a CPU, RAM and ROM, a drive motor 9b for raising/lowering the movable plate 7, and an operation unit 9c which receives operation input by a test examiner. When a type of the secondary battery 2, for example, is received via the operation unit 9c, the control circuit 9a controls the drive motor 9b so that the pressing force matching the secondary battery 2 is applied in steps, and partially crushes the secondary battery 2 using the round bar 5.

The measurement device 13 has a measurement circuit 13a which is comprised of a CPU, RAM and ROM, and an output unit 13b, such as a display, to output the measurement result. The measurement device 13 is connected to the temperature sensor 11 with or without a wire, and outputs the measurement result by the temperature sensor 11 via the output unit 13b. The measurement device 13 also decides whether the measurement result is a predetermined threshold, 160° C., for example, or less.

The measurement device 13 and the pressurizing device 9 are connected so that signals can be transmitted/received. The pressurizing device 9 presses the secondary battery 2 with a predetermined pressing force to partially crush the secondary battery 2, and sends the data on the pressing force to the measurement device 13. The measurement device 13 receives the data on the pressing force, and outputs information required for quality judgment of the secondary battery 2 via the output unit 13b.

Figure 4:
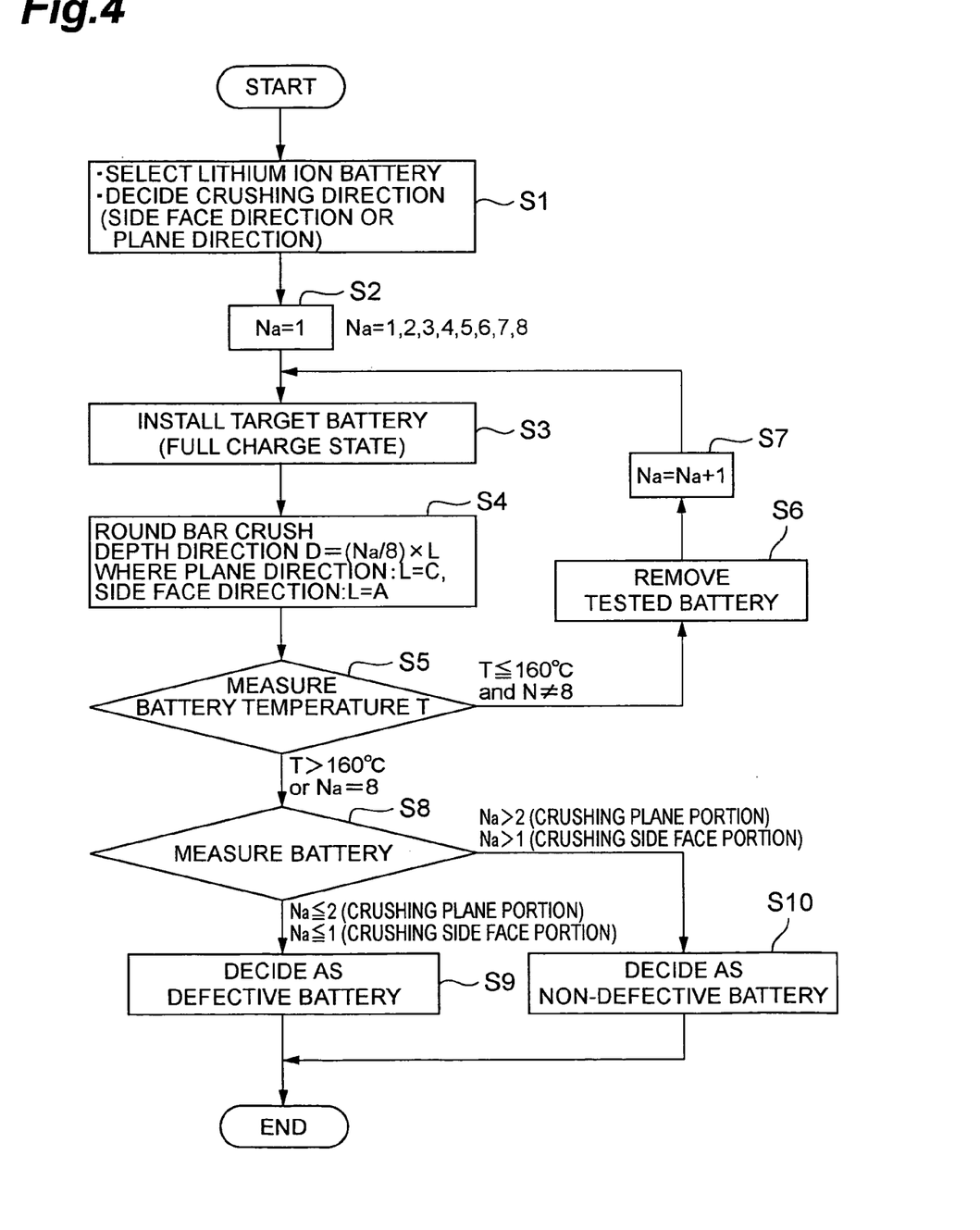
FIG. 4 is a flow chart depicting a procedure of the battery testing method according to the first embodiment.

Now the battery testing method will be described with reference to FIG. 4. FIG. 4 is a flow chart depicting a procedure of the battery testing method.

To start the battery testing method, the test examiner first selects a secondary battery 2 to be a testing target, such as a lithium ion battery, then prepares a plurality (e.g. 8) of identical secondary batteries 2 in a fully charged state, and decides a crushing direction of the secondary battery 2 (step S1).

Figure 2:
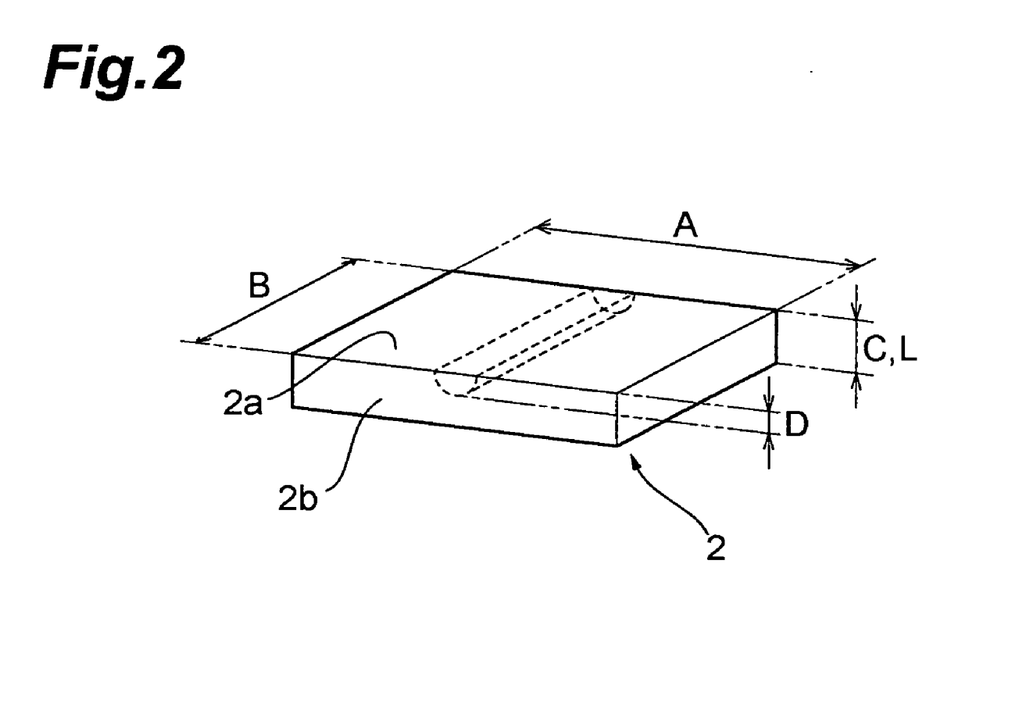
FIG. 2 is a perspective view depicting a state when a plane portion of a secondary battery is partially crushed.
Figure 3:
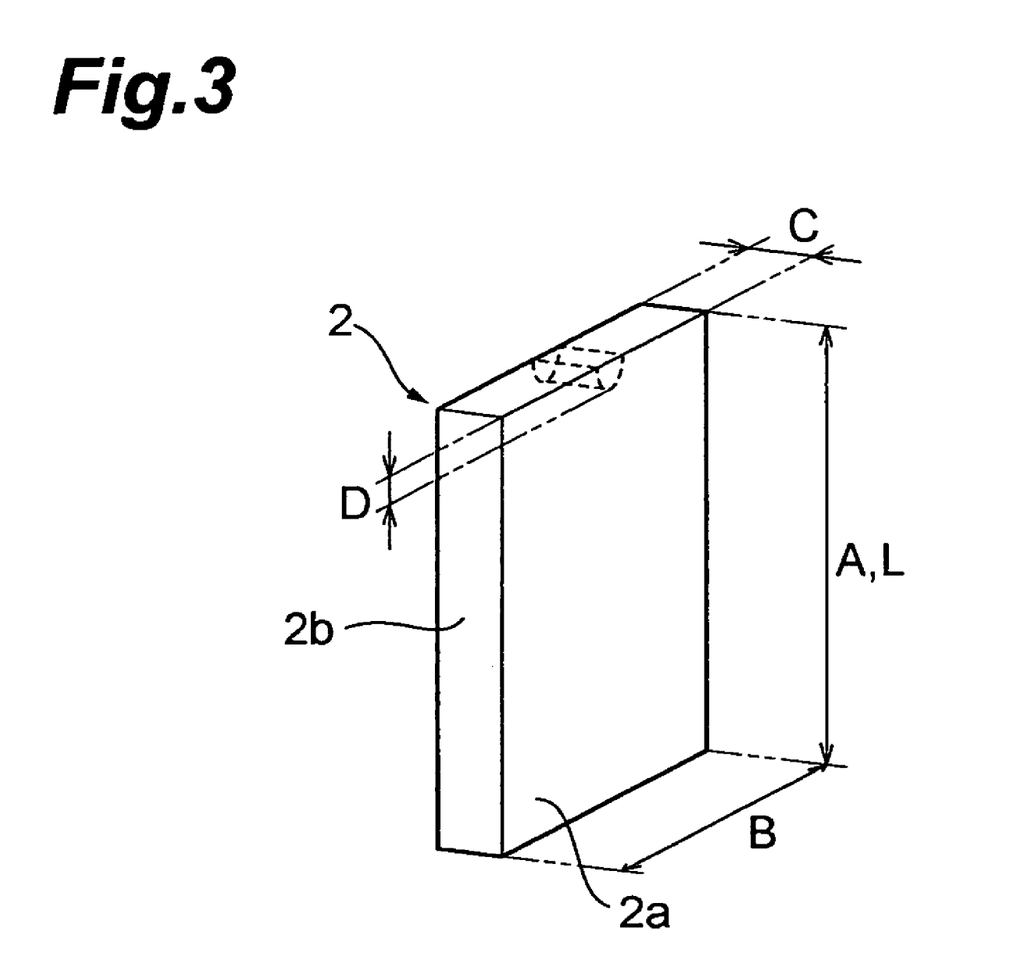
FIG. 3 is a perspective view depicting a state when a side face portion of a secondary battery is partially crushed.

As FIG. 2 and FIG. 3 show, the secondary battery 2 is a square type, that is, a hexahedron, and has, on peripheral surfaces thereof, a pair of plane portions 2a and side face portions 2b, which are the surfaces other than the plane portions 2a. The plane portions 2a have the largest areas among the surfaces, and the side face portions 2b surround and connect the plane portions 2a, and the width thereof is much smaller than the plane portion 2a. The plane portion 2a of the secondary battery 2 is a rectangle, and in FIG. 2 and FIG. 3, a dimension of the horizontal (long side) direction are indicated by "A", and a dimension of the vertical (short side) direction is indicated by "B", and the distance between the pair of plane portions 2a (height) is indicated by "C". The depth of the portion to be crushed is indicated by "D", and the secondary battery 2 is partially crushed (partial crush) by executing the crushing test with changing the depth D. In the state shown in FIG. 2, the battery is completely crushed when the depth D becomes the same as the battery height C, and in the state shown in FIG. 3, the battery is completely crushed when the depth D becomes the same as the battery height A.

Now how to decide the crushing direction will be described. FIG. 2 and FIG. 3 show the case when the secondary battery 2 is installed in a test stand 3 such that the surface to be crushed comes on top. Deciding the crushing direction means deciding the surface to which the round bar 5 contacts and crushes, and if the crushing direction is decided to be the plane portion 2a (see FIG. 2), the battery is set on the test stand 3 such that the plane portion 2a comes on top. As a result, the round bar 5 contacts the plane portion 2a and mainly crushes the plane portion 2a. If the crushing direction is decided to be the side face portion 2b (see FIG. 3), then the battery is set on the test stand 3 such that the side face portion 2b comes on top. As a result, the round bar 5 contacts the side face portion 2b and mainly crushes the side face portion 2b.

As FIG. 4 shows, when the secondary battery 2 is selected and the crushing direction is decided, the test examiner arbitrarily selects one of the eight secondary batteries 2, and sets data so as to be "Na=1" (step S2). This secondary battery 2 selected first becomes a secondary battery 2 corresponding to "Na=1". The test examiner also sets the selected secondary battery 2 on the test stand 3 (step S3). The secondary batteries 2 are sequentially selected, and the following processing is performed, and data is set each time in the sequence of "Na=2 to 8".

Then the test examiner performs the start operation for the pressurizing device 9. The control circuit 9a of the pressurizing device 9 controls the drive motor 9b, lowers the round bar 5 and presses the secondary battery 2, and partially crushes the battery. In this case, the pressurizing device 9 controls the pressing force to the secondary battery 2 by the round bar 5, so that the depth D of the partial crush satisfies the following Expression (1) (step S4).

$$D = (Na/N_M) \times L \tag{1}$$

In Expression (1), "L" is a length from the top end to the bottom end of the secondary battery 2 being set on the test stand 3, and "D" is a depth of the partial crush of the secondary battery 2 by the round bar 5. "$N_M$" is a total number of testing targets, and is "8" in the case of the present embodiment. "L" is different between the plane direction and the side face direction, and is dimension "C" in the case of the plane direction (see FIG. 2), and is dimension "A" or dimension "B" in the case of the side face direction (see FIG. 3).

The pressurizing device 9 is set to "Na=1" by the operation input of the test examiner, so the secondary battery 2 is partially crushed with the pressing force so that the depth D becomes "(⅛)×L".

Then the measurement circuit 13a of the measurement device 13 measures the battery temperature T of the partially crushed secondary battery 2 based on the detected value by the temperature sensor 11. The measurement circuit 13a decides whether the measurement result exceeds a predetermined threshold, 160° C., for example (step S5). If it is decided that the measurement result does not exceed 160° C., the measurement circuit 13a notifies the data to indicate that the measurement result is less than 160° C. to the pressurizing device 9, and the pressurizing device 9 raises the round bar 5 and releases pressure on the secondary battery 2. When the pressure by the round bar 5 is released, the test examiner removes the secondary battery 2 being set on the test stand 3 (step S6).

Then the test examiner selects a new secondary battery 2, and sets "Na=Na+1", that is Na=2, by operating the operation unit 9c of the pressurizing device 9 (step S7), and executes the processing from step S3 to step S5 again. The test examiner sequentially selects the plurality of secondary batteries 2 prepared as testing targets, and executes the step S3 to step S5 repeatedly. According to the above Expression (1), the depth D of the partial crush becomes deeper as the value of Na increases, so the pressing force to be applied to each secondary battery 2 in step S4 increases in steps as Na increases. As a result, several levels of crushing tests for different depths D of a partial crush are performed.

The measurement circuit 13a of the battery testing device 1A measures the battery temperature T sequentially from the secondary battery 2 with Na=1, and decides whether the measurement result exceeds a predetermined threshold (160° C.) each time (step S5), and if a first secondary battery 2 which exceeds 160° C. is detected, the measurement circuit 13a determines a value of Na of the first secondary battery 2 of which battery temperature T exceeded 160° C., and outputs it via the output unit 13b, and stops subsequent processing. For example, if the battery temperature T of the third secondary battery 2 exceeds 160° C., the measurement circuit 13a outputs Na=3 via the output unit 13b, and if the battery temperature T of the secondary battery 2 selected last exceeds 160° C., the measurement circuit 13a outputs Na=8 via the output unit 13b. If the battery temperature T of all eight secondary batteries 2 does not exceed 160° C., the measurement circuit 13a outputs the termination message to indicate no abnormality, via the output unit 13b. If the measurement result of Na=1 exceeds 160° C., the measurement circuit 13a sets a new secondary battery 2 on the test stand 3 to be Na=2, without performing the subsequent quality determination, and performs the crushing test repeatedly. If Na=8, "D=(8/8)×L", and battery is completely crushed.

When a value of Na or termination message is output from the output unit 13b, the test examiner decides the quality of batteries based on the content of the output (step S8). For example, if it is specified that the reference value of the quality determination, when the crushing direction is the plane portion 2a, is "2", the test examiner decides a battery as defective when the termination message or a value Na≦2, such as Na=1 or 2, is output (step S9). If a value Na>2, such as 3, is output, the test examiner decides the battery as non-defective (step S10). If it is specified that the reference value of the quality determination, when the crushing direction is side portion 2b, is "1", the test examiner decides the battery as defective when the termination message or a value Na≦1 is output, and if a value Na>1, such as 2, is output, the test examiner decides the battery as non-defective.

Figure 5:
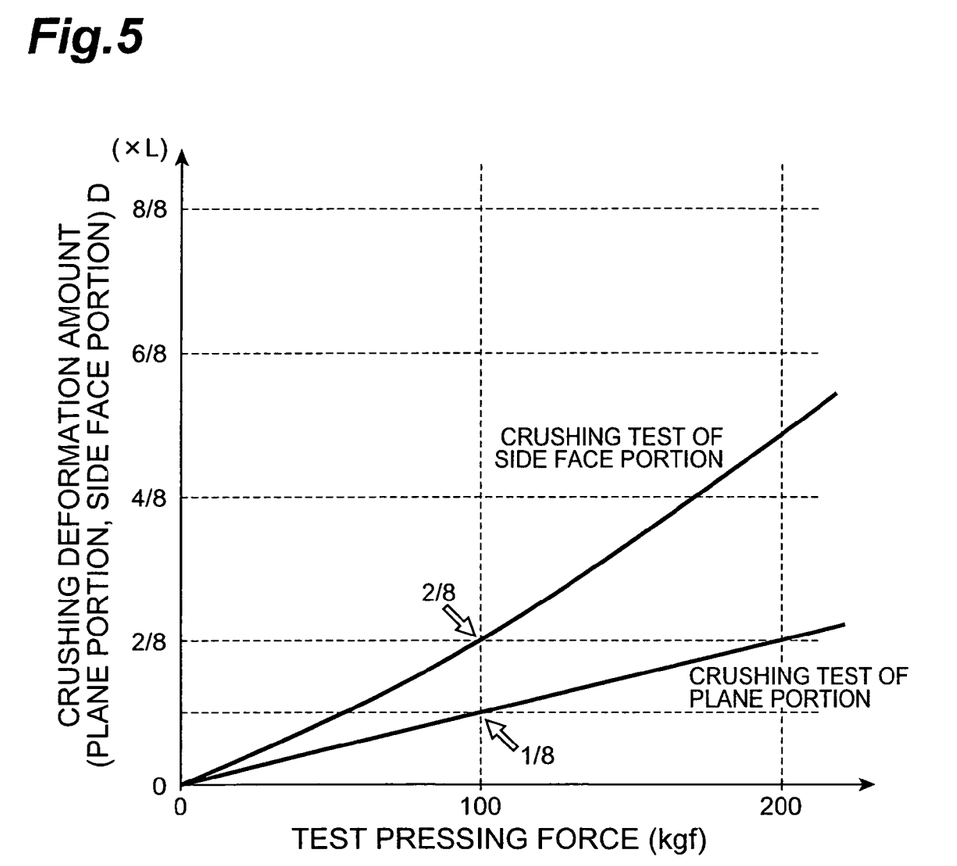
FIG. 5 is a graph showing the relationship between a test pressing force and a crush deformation amount.

Now how to determine the reference value for a quality determination is described. FIG. 5 shows an applied pressing force (kgf) when a secondary battery 2 is crushed, and the deformation amount (depth) at crushing. In a range of daily use of mobile equipment, such as a portable telephone, an assumed pressure that could be applied, is human weight, a bag, iron, and a notebook PC, for example, and is about 100 (kg) or less. Therefore the reference value for a quality determination is determined based on the deformation amount when the secondary battery 2 is damaged with the pressing force 100 (kgf), which is the case when the battery is pressed with a dead weight 100 (kg). For example, if 100 (kgf) of pressing force is applied to the plane portion 2a of the secondary battery 2 of the present embodiment, about ⅛ of the entire thickness in the depth direction deforms. Therefore if the plane portion 2a is selected in the crushing direction, Na=1 (based on Expression (1)) becomes the reference Na to decide the non-defective battery. If the side face portion 2b is selected as the crushing direction, applying 100 kgf of pressure deforms the battery by about ⅖ of the entire thickness in the depth direction. Therefore if the side face portion 2b is selected in the crushing direction, Na=2 (based on Expression (2)) becomes the reference Na to decide a non-defective battery.

Figure 6:
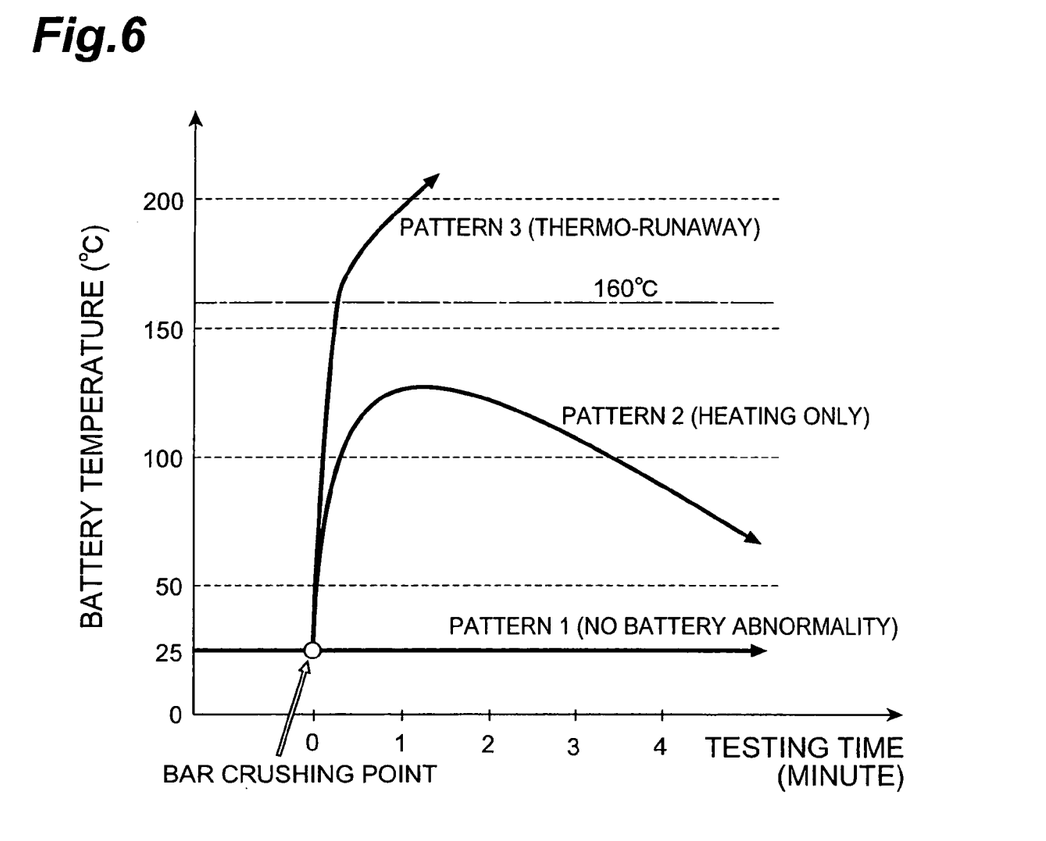
FIG. 6 is a graph showing the relationship between an elapsed time (testing time) and a battery temperature after the battery is partially crushed by pressing by a round bar.

Now how to decide the predetermined threshold (160° C.) to be a reference to decide whether the partially crushed secondary battery 2 is abnormal is described. FIG. 6 shows a temperature change of the secondary battery 2 after crushing. As FIG. 6 shows, if the secondary battery 2 is crushed, three modes of temperature changes (behaviors), patterns 1 to 3, are possible.

Pattern 1 is a pattern when a short between the anode and cathode inside the secondary battery 2 is not generated, and a temperature change does not occur even if the secondary battery 2 is crushed. Pattern 2 is a pattern when a short is generated between the anode and cathode inside the secondary battery 2, and the battery temperature T increases due to the Joule heat generated by the short circuit current, but does not reach a critical temperature (temperature at which thermal decomposition of the materials of the secondary battery 2 starts: about 150° C. to 160° C.), and the battery temperature T decreases after reaching a peak as the short circuit current drops. Pattern 3 is a pattern when a short is generated between the anode and cathode inside the secondary battery 2, the temperature of the secondary battery 2 due to Joule heat generated by the short circuit current increases, then the temperature of the secondary battery 2 reaches a critical temperature (temperature at which thermal decomposition of the materials of the secondary battery 2 starts: about 150° C. to 160° C.), and thermal decomposition of the battery materials of the electrode and electrolytes of the secondary battery 2 starts, and thermo-runaway starts.

The thermo-runaway of pattern 3 could cause about 500° C. abnormal heating and smoking of the secondary battery 2 itself. In the present embodiment, it is decided that the secondary battery 2 is in a non-defective battery range when the partially crushed secondary battery 2 behaves according to pattern 1 or pattern 2, and is a defective battery when it behaves according to pattern 3. As a result, it is most desirable to monitor whether the battery temperature T of the secondary battery 2 reaches a critical temperature, as the reference to decide a defective battery, which means that it is desirable to set the battery temperature T to be the reference to decide the presence of an abnormality, that is 150° C. to 160° C., and particularly the generation of a thermo-runaway can be checked without fail if the battery temperature T is 160° C., the upper limit of the above range.

In the present embodiment, the test examiner decides the quality of the battery based on the value of Na which is output via the output unit 13b, but a value of Na that satisfies the safety standard may be set in the measurement device 13 in advance, so that the measurement circuit 13a compares the value Na determined in step 5 and the value Na that satisfies the safety standard to decide the quality of the battery, and a message to indicate "non-defective" is output via the output unit 13b if it is decided as a non-defective battery, and a message to indicate "defective" is output via the output unit 13b if it is decided as a defective battery. In the present embodiment, the test examiner sets the secondary battery 2 and replaces the secondary battery 2, but this may be automated. For example, an entry hopper of the secondary battery 2 and storing portion may be disposed in the pressurizing device, and if the test examiner enters a plurality of identical types of testing target secondary batteries through the entry hopper, the secondary batteries are sequentially selected, and replaced with the next one after being partially crushed.

In the battery testing device 1A and the battery testing method according to the present embodiment, the temperature and voltage of the secondary battery 2 are measured when the battery is in an incomplete and partially crushed state, instead of being completely crushing the secondary battery 2 in one direction (complete crush). Concerning the crushing of the secondary battery 2, a partial crush occurs more likely than a complete crush in a state of normal use of a portable telephone or like equipment (state a user of a portable telephone tends to encounter due to dropping or damaging portable telephone). Also in the case of a lithium ion battery, the complete crush state of a battery is not the worst condition in the determination of an abnormality caused by an internal short, so the behavior of the battery when it is damaged cannot be appropriately verified. In other words, a partial crushing test has more advantages than a complete crushing test as a method to test a secondary battery 2 strictly confirming its safety. According to the battery testing device 1A and the battery testing method, the secondary battery 2 is evaluated by the partial crushing test, so the behavior of the secondary battery 2 when it is damaged can be appropriately verified.

The pressurizing device 9 controls the pressing force of the round bar 5 so that the depths D of the partial crush of a plurality of secondary batteries 2 become different respectively, and the measurement device 13 measures the respective temperature of the plurality of partially crushed secondary batteries 2. Since the depths of the partial crush of a plurality of testing target secondary batteries 2 are all different, the behavior of the secondary batteries 2 when damaged at a respective partial crush depth D can be appropriately verified.

The pressurizing device 9 controls the pressing force so as to satisfy the above mentioned Expression (1), so quantitative verification based on Expression (1) becomes possible, and an evaluation decision comparing with other types of batteries can be performed.

The plurality of secondary batteries 2 are partially crushed according to the sequence of Na, and the pressurizing device 9 controls the pressing force so that D of Expression (1) increases in steps, and the measurement device 13 measures the respective temperature of the plurality of partially crushed secondary batteries 2, and determines the first value Na at which the measurement result exceeds a predetermined threshold (160° C.), so the quality of the battery can be decided based on the determined Na as a reference.

The secondary battery 2 is a square type and has a pair of plane portions 2a and side face portions 2b, and the reference value "1", to decide quality when each of the plurality of secondary batteries 2 is partially crushed by applying pressing force on the plane portion 2a, is smaller than the reference value "2" used in the case of partially crushing each of the plurality of secondary batteries 2 by applying pressing force on the side face portion 2b, therefore evaluation, in the case of when the thin side of the battery is damaged, becomes more strict, and higher safety can be implemented.

Second Embodiment

The second embodiment will now be described with reference to FIG. 7 to FIG. 11. In the battery testing device 1B according to the second embodiment, composing elements the same as the battery testing device 1A according to the first embodiment are denoted with the same symbols, for which description thereof is omitted.

Figure 7:
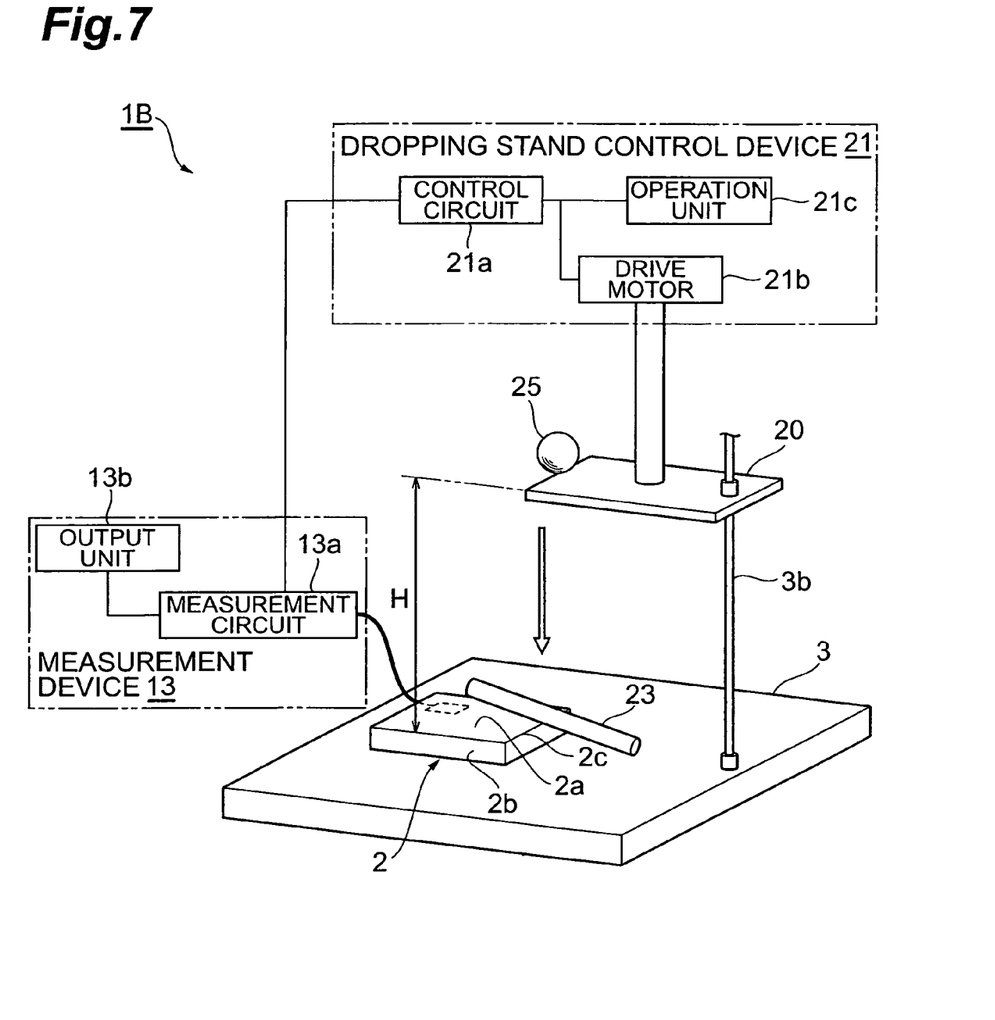
FIG. 7 is a diagram depicting an overview of the battery testing device according to a second embodiment of the present invention.
Figure 8:
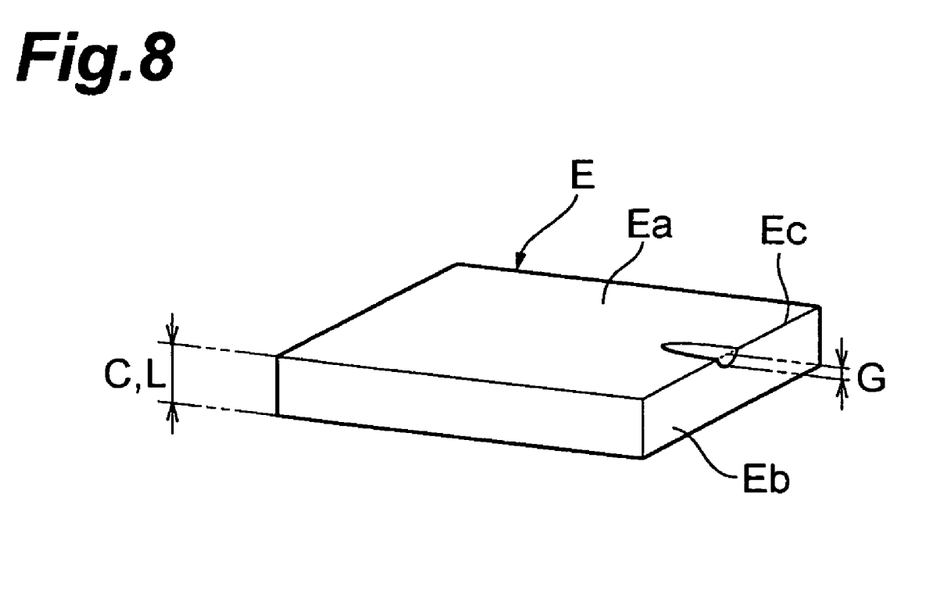
FIG. 8 is a perspective view depicting a state when a corner portion of a secondary battery is partially crushed.

FIG. 7 is a diagram depicting an overview of the battery testing device 1B according to the second embodiment. The battery testing device 1B has a test stand 3, a guide rod 3b which vertically stands on the test stand 3, a dropping stand 20 which rises/lowers guided by the guide rod 3b, a dropping stand control device (pressurizing unit) 21, which is connected with the dropping stand 20 so as to hold the dropping stand 20 at a predetermined height, and which raises/lowers the drop stand 20 to control the height of the drop stand 20, a round bar (interference member) 23 which diagonally rests on the corner portion 2c of a secondary battery 2 being set on the test stand 3, a spherical weight 25 which drops from a movable plate 7 and collides with the round bar 23, so that the secondary battery 2 is pressed and is partially crushed indirectly by the impact, a temperature sensor 11 which contacts the secondary battery 2 on the test stand 3, and a measurement device 13 connected to the temperature sensor 11. In the present embodiment, the behavior of the crushed secondary battery 2 is verified based on the temperature detected by the temperature sensor 11, but detection unit for measuring the voltage of the secondary battery 2 instead of temperature, or for measuring both temperature and voltage, may be provided so that the behavior of the crushed secondary battery 2 is verified based on this measurement result.

The drop stand control device 21 has a control circuit 21a which is comprised of a CPU, RAM and ROM, a drive motor 21b which raises/lowers the dropping stand 20; and an operation unit 21c which receives operation input by a test examiner. When a type of secondary battery 2, for example, is received via the operation unit 21c, the control circuit 21a controls the drive motor 21a so that the pressing force matching the secondary battery 2 is applied in steps, in other words, the secondary battery 2 is partially crushed with the impact of the weight 25, and the height of the dropping stand 20 is adjusted. The dropping stand control device 21 and the measurement device 13 are connected such that signals can be transmitted to/received from each other. The dropping stand control device 21 presses the secondary battery 2 with a predetermined pressing force (impact) to partially crush the secondary battery 2, and notifies the data on the pressing force to the measurement device 13. The measurement device 13 receives the data on the pressing force, and outputs from the output unit 13b information required for deciding the quality of the secondary battery 2.

Figure 9:
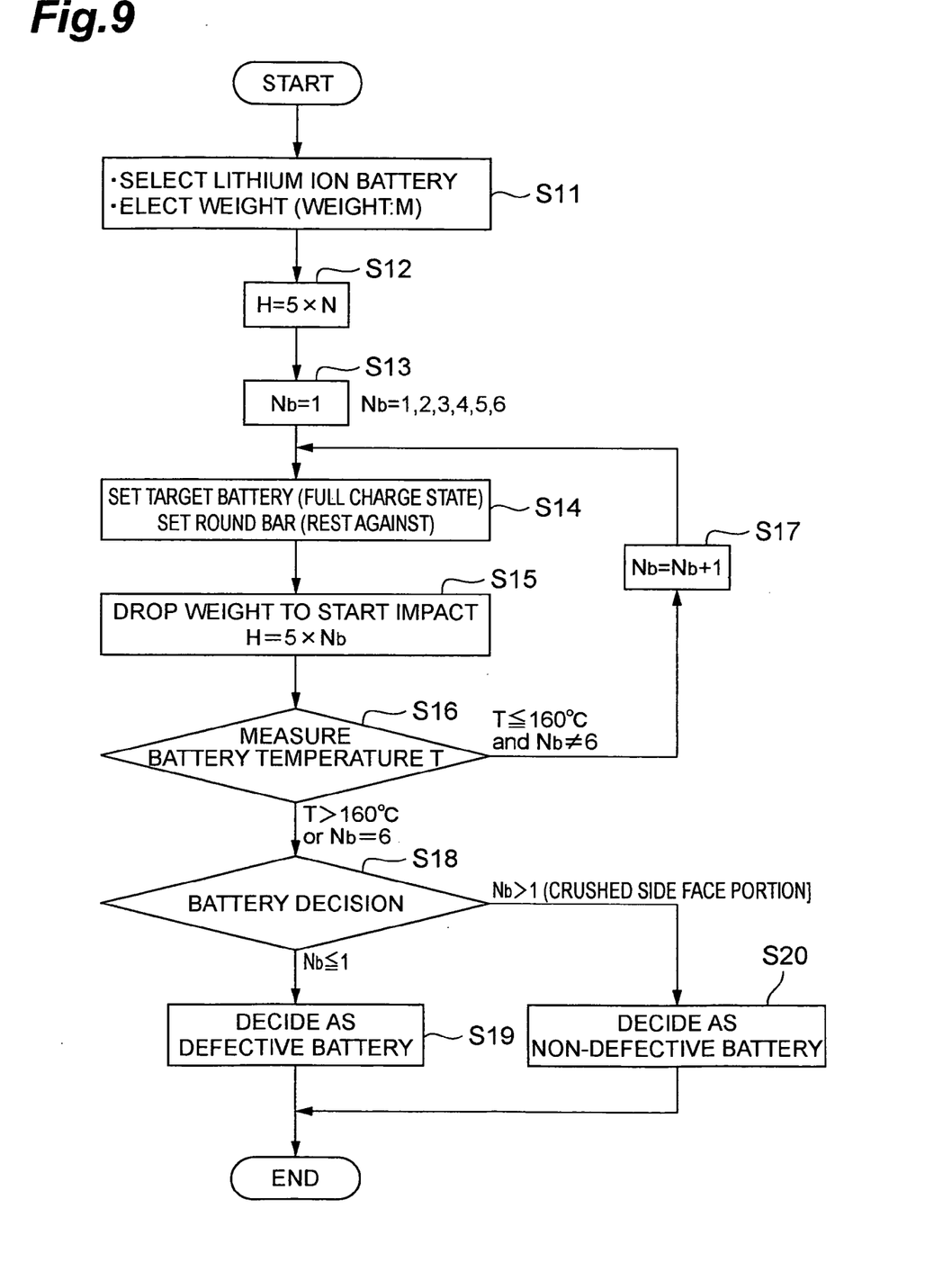
FIG. 9 is a flow chart depicting a procedure of the battery testing method according to the second embodiment.

Now a battery testing method according to the second embodiment will be described with reference to FIG. 9. FIG. 9 is a flow chart depicting a procedure of the battery testing method of the second embodiment.

To start the battery testing method, the test examiner first selects a secondary battery 2 to be a testing target, such as a lithium ion battery, then prepares a plurality (e.g. 6) of identical types of secondary batteries 2 in full charged state, and decides a weight M of the weight 25 (step S11). In the present embodiment, M=2 (kg) is selected.

The test examiner operates the operation unit 21c of the dropping stand control device 21, and sets the following Expression (2) to determine the height of the dropping stand 20.

$$H = Ho \times Nb \quad (2)$$

In Expression (2), "H" is the height of the dropping stand 20, Ho is the height to be a reference, Nb is a natural number assigned sequentially from 1 corresponding to the plurality of secondary batteries 2 respectively. In the present embodiment, Ho=5 (cm).

The test examiner arbitrarily selects one of the six secondary batteries 2 and sets data to be "Nb=1" by operating the operation unit 21c. This secondary battery 2 selected first becomes a secondary battery 2 corresponding to Nb=1. The test examiner installs the selected secondary battery 2 on the test stand 3 (see FIG. 7), and diagonally rests the round bar 23 against the corner portion to crush the secondary battery 2 by impact (step S14).

Then the test examiner performs an operation to start the dropping stand control device 21. The dropping stand control device 21 raises the dropping stand 20 to a predetermined height H determined by Expression (2), and drops the weight 25 in this state onto the round bar 23 by releasing a weight stopper installed in the dropping stand 20, for example, so as to partially crush the secondary battery 2 indirectly by the impact (step S15). The secondary battery 2 (see FIG. 8) receives the drop impact of the weight 25, and the corner portion thereof (upper edge portion of the side face portion 2b against which the round bar 23 is rested) is crushed to the depth G (see FIG. 8). In other words, a partial crush for the amount of depth G is performed by dropping the weight 25 from the predetermined height H.

The measurement circuit 13a of the measurement device 13 measures the battery temperature T of the partially crushed secondary battery 2 based on the detected value by the temperature sensor 11. Also the measurement circuit 13a decides whether the measurement result exceeds a predetermined threshold (160° C.) (step S16). If it is decided that the measurement result does not exceed 160° C., the measurement circuit 13a notifies the data to indicate the measurement result is less than 160° C. to the dropping stand control device 21, and outputs a message to indicate no abnormality via the output unit 13b.

The test examiner who confirmed the message to indicate no abnormality which was output via the output portion 13b selects a new secondary battery 2, sets "Nb=Nb+1", that is Nb=2, by operating the operation unit 21c of the dropping stand control device 21 (step S17), and executes the processing from step S13 to step S15 again. The test examiner sequentially selects a plurality of secondary batteries 2 prepared as testing targets, and executes step S13 to step S15 repeatedly. According to Expression (2), the height H of the dropping stand 20 increases as the value Nb increases, so the pressing force (impact) applied to each secondary battery 2 in step S14 increases in steps as Nb increases. As a result, several levels of crushing test with different impacts are executed.

The measurement circuit 13a of the battery testing device 1B measures the battery temperature T sequentially from the secondary battery 2 with Nb=1, and decides whether the measurement result exceeds 160° C. each time (step S16), and if the first secondary battery 2 of which measurement result exceeds 160° C. is detected, the measurement circuit 13a determines a value of Nb of the first secondary battery 2 of which the battery temperature T exceeds 160° C., and outputs it via the output unit 13b, and stops subsequent processing. If the battery temperature T of all six secondary batteries 2 did not exceed 160° C., the measurement circuit 13a outputs a termination message to indicate no abnormality via the output unit 13b. If the measurement result of Nb=1 exceeds 160° C., the test examiner sets a new secondary battery 2 on the test stand 3 so as to be Nb=2, and the crushing test is executed repeatedly.

When the value of Nb or the termination message is output via the output unit 13b, the test examiner decides the quality of the battery based on the output content (step S18). In the present embodiment, the reference value of the quality determination is specified to "1", and a battery for which termination message or Nb≦1 is output is decided as a defective battery (step S19), and a battery for which Nb>1 is output is decided as a non-defective battery (step S20).

Figure 10:
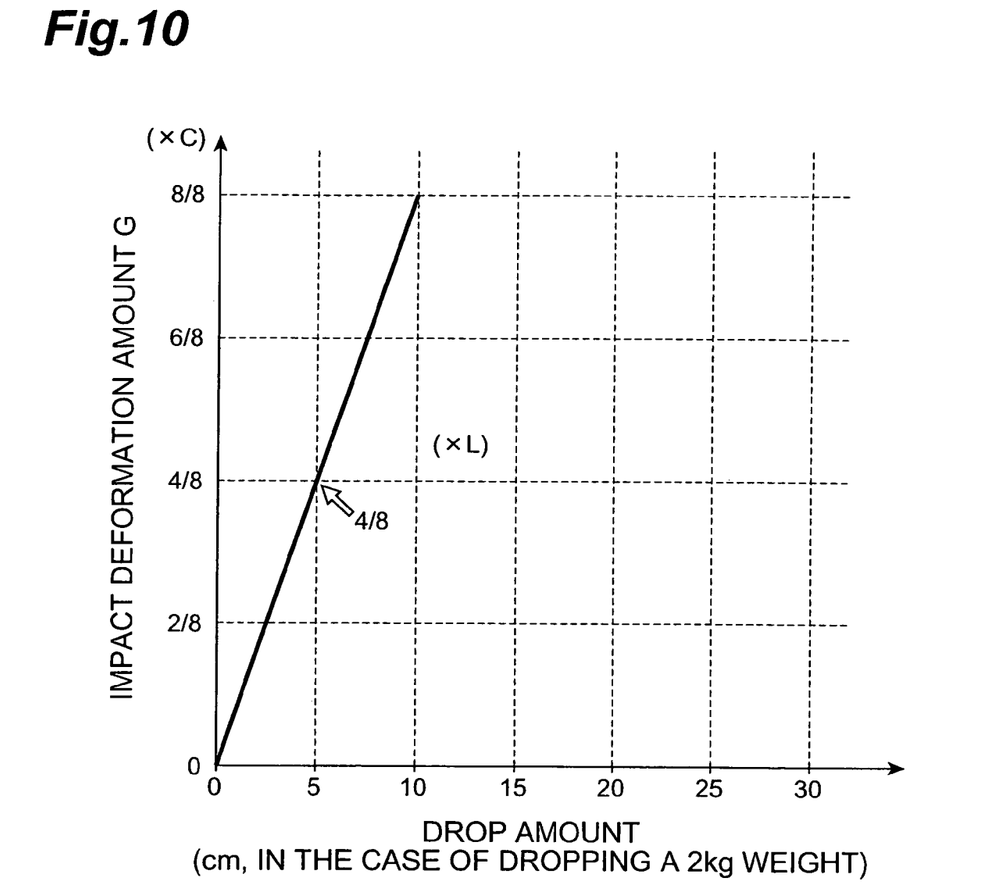
FIG. 10 is a graph showing the relationship between a drop amount and an impact deformation amount.
Figure 11:
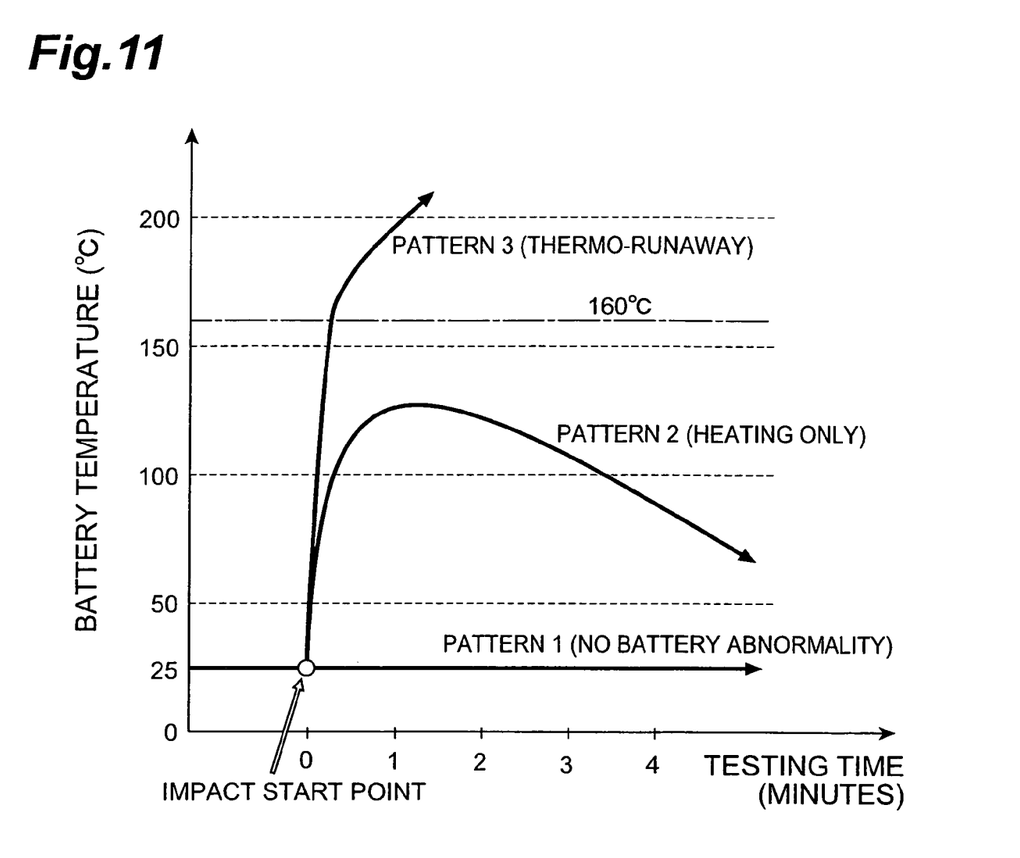
FIG. 11 is a graph showing the relationship between an elapsed time (testing time) and a battery temperature after the battery is partially crushed by dropping a weight.

Now how to decide a reference value of a quality determination will be described. FIG. 10 shows a height (cm) at which the weight 25 is dropped, that is, the drop amount and the impact deformation amount of the secondary battery 2 due to the drop and impact. Basically a case of crushing about half in the depth direction of the secondary batteries 2 is a case that is likely to occur in every day life. Therefore a reference Nb to decide a non-defective battery is set to Nb of a dropping distance when half of the corner portion of the secondary battery 2 is damaged by dropping a 2 kg weight, that is 5 cm (Nb=1).

In the battery testing device 1B and the battery testing method according to the present embodiment, the temperature and voltage are measured in an incompletely and partially crushed state, instead of measuring the temperature and voltage of the secondary battery 2 completely crushed in one direction (complete crush), so the behavior when the secondary battery 2 is damaged can be appropriately verified.

Also the dropping stand control device 21 controls the pressing force (impact) by changing a predetermined height H from each of the plurality of secondary batteries 2, and the measurement device 13 measures the respective temperature of the plurality of partially crushed secondary batteries 2, so the pressing force of the pressing member generated by the drop impact can be easily controlled by changing the predetermined height H.

The dropping stand control device 21 controls the pressing force so that the predetermined height H satisfies the above mentioned Expression (2), so a quantitative verification based on Expression (2) is possible, and evaluation comparing with other types of batteries can be easily decided.

The plurality of secondary batteries 2 are partially crushed in the sequence according to Nb, and the dropping stand control device 21 controls the pressing force so that H increases in steps, and the measurement device 13 measures at least one of temperature and voltage of each of the plurality of partially crushed secondary batteries 2, and determines the first value Nb with which the measurement result exceeds the predetermined threshold "160° C.", therefore the quality of a battery can be decided based on the determined Nb.

The present invention is not limited to the above embodiment. For example, in the above embodiments, the plurality of batteries are experimented with such that the pressing force (including the impact in the second embodiment) increases in steps according to the selected sequence, but may be experimented with such that the pressing force decreases according to the selected sequence. To verify the behavior of the partially crushed battery, the battery temperature is measured in the above embodiments, but a voltage value, current value or combination thereof may be measured.

What is claimed is:

1. A battery testing device, comprising:
a test stand on which a battery for testing may be set;
a pressing member that crushes the battery;
a pressurizing unit that controls a pressing force of the pressing member to the battery; and
a measurement unit that measures at least one of temperature and voltage of the battery, wherein
the pressurizing unit controls a respective pressing force of the pressing member for each of a plurality of batteries set on the test stand such that each of the plurality of batteries is incompletely and partially crushed, the respective pressing force increasing for a predetermined number of the plurality of batteries,
each of the plurality of batteries are manufactured to be identical, and
the measurement unit measures at least one of temperature and voltage of each of the plurality of incompletely and partially crushed batteries.

2. The battery testing device according to claim 1, wherein
the pressurizing unit controls each respective pressing force so that a depth of a partial crush in each of the plurality of batteries is different, and
the measurement unit measures at least one of temperature and voltage of each of the plurality of incompletely and partially crushed batteries respectively.

3. The battery testing device according to claim 2, wherein
the pressurizing unit controls the pressing force so as to satisfy $D=(Na/N_M) \times L$, where
D is a depth of partial crush, $N_M$ is a number of testing targets, Na is a natural number from 1 to $N_M$, and L is a distance from a top end to a bottom end of a battery of the plurality of batteries in a state where the battery is set on the test stand.

4. The battery testing device according to claim 3, wherein
the plurality of batteries are partially crushed in sequence according to a sequentially increasing value of the natural number Na,
the pressurizing unit controls the pressing force so that the depth D increases stepwise, and
the measurement unit measures at least one of temperature and voltage of each of the plurality of incompletely and partially crushed batteries, and determines a first value of the natural number Na for which a measurement result exceeds a predetermined threshold.

5. The battery testing device according to claim 1, wherein
the pressing member drops down to the battery set on the test stand from a predetermined height to partially crush the battery, and
the pressurizing unit controls the pressing force by adjusting the predetermined height.

6. The battery testing device according to claim 5, wherein
the battery is a square shaped type,
a bar type interference member which rests against a corner portion of the battery set on the test stand is further provided, and
the pressing member partially crushes the corner portion of the battery indirectly by colliding with the interference member.

7. The battery testing device according to claim 5, wherein
the pressing member partially crushes each of the plurality of batteries,
the pressurizing unit controls the respective pressing force of the pressing member for each of the plurality of batteries according to a different predetermined height of the pressing member for each of the plurality of batteries respectively, and
the measurement unit measures at least one of temperature and voltage of each of the plurality of incompletely and partially crushed batteries respectively.

8. The battery testing device according to claim 6, wherein
the pressing member partially crushes each of the plurality of batteries subjected to testing targets,
the pressurizing unit controls the respective pressing force of the pressing member for each of the plurality of batteries according to a different predetermined height of the pressing member for each of the plurality of batteries respectively, and
the measurement unit measures at least one of temperature and voltage of each of the plurality of incompletely and partially crushed batteries respectively.

9. The battery testing device according to claim 7, wherein
the pressurizing unit controls the pressing force so as to satisfy $H=Ho \times Nb$, where
H is a predetermined height of the pressing member for each of the plurality of batteries, Ho is a reference height, and Nb is a natural number sequentially assigned from 1 to a number of the plurality of batteries.

10. The battery testing device according to claim 8, wherein
the pressurizing unit controls the pressing force so as to satisfy $H=Ho \times Nb$, where
H is a predetermined height of the pressing member for each of the plurality of batteries, Ho is a reference height, and Nb is a natural number sequentially assigned from 1 to a number of the plurality of batteries.

11. The battery test device according to claim 9, wherein
the plurality of batteries are partially crushed in sequence according to a sequentially increasing value of the natural number Nb,
the pressurizing unit controls the pressing force so that the height H increases stepwise, and
the measurement unit measures at least one of temperature and voltage of each of the plurality of incompletely and partially crushed batteries, and determines a first value of the natural number Nb for which a measurement result exceeds a predetermined threshold.

12. The battery test device according to claim 10, wherein
the plurality of batteries are partially crushed in sequence according to a sequentially increasing value of the natural number Nb,
the pressurizing unit controls the pressing force so that the height H increases stepwise, and
the measurement unit measures at least one of temperature and voltage of each of the plurality of incompletely and partially crushed batteries, and determines a first value of the natural number Nb for which a measurement result exceeds a predetermined threshold.

13. The battery testing device according to claim 4, wherein
the measurement unit measures the temperature of each of the plurality of incompletely and partially crushed batteries, and
the predetermined threshold is included in a 150° C. to 160° C. range.

14. The battery testing device according to claim 11, wherein
the measurement unit measures the temperature of each of the plurality of incompletely and partially crushed batteries, and
the predetermined threshold is included in a 150° C. to 160° C. range.

15. The battery testing device according to claim 12, wherein
- the measurement unit measures the temperature of each of the plurality of incompletely and partially crushed batteries, and
- the predetermined threshold is included in a 150° C. to 160° C. range.

16. A battery testing method, comprising:
- a partial crushing step of applying a pressing force to a battery set on a test stand such that the battery incompletely and partially crushed;
- a detection step of detecting at least one of temperature and voltage of the incompletely and partially crushed battery, to provide a measurement result; and
- a determination step of determining whether the measurement result is greater than or equal to a predetermined threshold, wherein
- the partial crushing step includes controlling a respective pressing force applied to each of a plurality of batteries set on the test stand such that each of the plurality of batteries is incompletely and partially crushed, the respective pressing force increasing for a predetermined number of the plurality of batteries and each of the plurality of batteries being manufactured to be identical, and
- the detection step includes detecting at least one of temperature and voltage of each of the plurality of incompletely and partially crushed batteries.

17. The battery testing method according to claim 16, further comprising the steps of:
- sequentially selecting a battery of the plurality of batteries;
- performing the partial crushing step, the detection step, and the determination step for the selected battery;
- increasing the pressing force applied in the partial crushing step stepwise according to a sequence of the sequentially selecting a battery of the plurality of batteries; and
- determining that the battery is a non-defective product, when a determination is made in the determination step that a value, which indicates a sequence number of a first battery exhibiting a measurement result that exceeds a predetermined threshold, is equal to or greater than a quality determination reference value.

18. The battery testing method according to claim 17, wherein
- each of the plurality of batteries is a square shaped type having, on peripheral surfaces, a pair of plane portions facing each other, and side face portions, of which area is smaller than the plane portions, and
- the quality determination reference value in a case of partially crushing each of the plurality of batteries by applying the pressing force on a plane portion of the plane portions is smaller than that in a case of partially crushing each of the plurality of batteries by applying the pressing force on a side face portion of the side face portions.

\* \* \* \* \*